United States Patent
Kurita et al.

(10) Patent No.: US 6,898,640 B1
(45) Date of Patent: May 24, 2005

(54) COMMUNICATION SYSTEM FOR MOBILE DEVICES

(75) Inventors: Shigetaka Kurita, Saitama (JP);
Norihiko Hirose, Tokyo (JP);
Masaharu Nakatsuchi, Kanagawa (JP);
Keizaburo Sasaki, Kanagawa (JP)

(73) Assignee: NTT DoCoMo, Inc., Tokyo (JP)

( * ) Notice: Subject to any disclaimer, the term of this patent is extended or adjusted under 35 U.S.C. 154(b) by 0 days.

(21) Appl. No.: 09/600,429

(22) PCT Filed: Dec. 24, 1999

(86) PCT No.: PCT/JP99/07281

§ 371 (c)(1),
(2), (4) Date: Jul. 12, 2000

(87) PCT Pub. No.: WO00/41364

PCT Pub. Date: Jul. 13, 2000

(30) Foreign Application Priority Data

Dec. 28, 1998 (JP) .......................................... 10-374627

(51) Int. Cl.⁷ ............................................ G06F 15/173
(52) U.S. Cl. ........................ 709/238; 709/236; 709/222
(58) Field of Search ................................ 709/225, 233, 709/247, 224, 238, 203, 217–219, 227–229, 244, 236, 252, 245; 705/1; 370/349, 389, 465, 352, 443, 331, 469, 397, 467; 345/744; 713/201; 435/461; 712/29

(56) References Cited

U.S. PATENT DOCUMENTS

| | | | |
|---|---|---|---|
| 5,727,159 A | | 3/1998 | Kikinis |
| 5,778,189 A | * | 7/1998 | Kimura et al. ............... 709/236 |
| 5,784,362 A | * | 7/1998 | Turina ......................... 370/321 |
| 6,115,390 A | * | 9/2000 | Chuah ......................... 370/443 |
| 6,266,704 B1 | * | 7/2001 | Reed et al. .................. 709/238 |
| 6,289,377 B1 | * | 9/2001 | Lalwaney et al. .......... 709/222 |
| 6,304,574 B1 | * | 10/2001 | Schoo et al. ................. 370/401 |
| 6,400,712 B1 | * | 6/2002 | Phillips ....................... 370/355 |
| 6,400,729 B1 | * | 6/2002 | Shimadoi et al. ........... 370/466 |
| 6,496,491 B2 | * | 12/2002 | Chuah et al. ................ 370/331 |

(Continued)

FOREIGN PATENT DOCUMENTS

| | | |
|---|---|---|
| EP | 0 828 367 A2 | 3/1998 |
| JP | H8-340336 | 12/1996 |
| JP | 10-229416 A | 8/1998 |

OTHER PUBLICATIONS

Mobile Agents: A Survey of Fault–Tolerance and Security.—Hartline (1998); www.cs.washington.edu/homes/hartline/papers/agent–security.ps.*

(Continued)

*Primary Examiner*—Thong Vu
(74) *Attorney, Agent, or Firm*—Brinks Hofer Gilson & Lione

(57) ABSTRACT

The present invention has the purpose of providing technology capable of efficiently transmitting data when performing data communications between a mobile station and a server apparatus. A simplified protocol TL is employed on the transport layer instead of TCP/IP. The simplified protocol TL is used as the communication protocol on a wireless communication path (radio-oriented interval) between an MS (Mobile Station) 1 and a GWS (GateWay Server) 5. The simplified TL protocol is utilized to relay data communications between the MS 1 and a CPS 8 (Content Provider Server). The response of data communications is therefore improved by a decrease in traffic between the MS 1 and the GWS 5 and reduction in overhead in comparison to when TCP/IP is deployed. As a result, the user can efficiently access content provided by the CPS 8 over the Internet via a wireless communication path. Efficient access may occur even where the wireless communication path has low data transmission capacity in comparison to a wireline communication path. In addition, efficient access may occur where the user is using an MS 1 which has insufficient data processing power to deploy TCP/IP.

7 Claims, 16 Drawing Sheets-

U.S. PATENT DOCUMENTS

| | | | | |
|---|---|---|---|---|
| 6,529,524 B1 | * | 3/2003 | Liao et al. | 370/467 |
| 6,542,734 B1 | * | 4/2003 | Abrol et al. | 455/412.1 |
| 6,546,003 B1 | * | 4/2003 | Farris | 370/352 |
| 6,574,239 B1 | * | 6/2003 | Dowling et al. | 370/469 |
| 6,590,588 B2 | * | 7/2003 | Lincke et al. | 345/744 |
| 6,785,823 B1 | * | 8/2004 | Abrol et al. | 713/201 |

OTHER PUBLICATIONS

Network Working Group G. McGregor Request for Comments: 1332.. www.tzi.de/~cabo/pdfrfc/rfc1332.txt.pdf.*

Securing QoS: Threats to RSVP Messages and their Countermeasures—Wu, Fu, Huang (1999) arqos.csc.ncsu.edu/papers/1999_10_IWQOS99.ps.*

LANET: Wireless Internet Access ; lucilia.ebc.ee/~enok/radiolink/HTMLDocument.html.*

Microsoft Word—ip_tech_Wireless_Internet.doc ; keskus.hut.fi/opetus/s38130/s98/wireless . . . ss_internet.pdf.*

"Wireless Application Protocol Wireless Transaction Protocol Specification", WAPFORUM, Online, Apr. 30, 1998 pp. 1–71, URL:http://www.wapforum.org/what/technical_1_0.htm.

"Wireless Application Protocol Architecture Specification", WAP FORUM, Online, Apr. 30, 1998, pp. 1–20, URL:http://www.wapforum.org/what/technical_1_0.htm.

Heidemann J. et al.: "Modeling The Performance Of HTTP Over Several Transport Protocols", IEEE / ACM Transactions On Networking, IEEE Inc., New York, US, vol. 5, No. 5, Oct. 1, 1997, pp. 616–630.

1998 IEICE Society Conference, "A Study on Transport Protocol for Mobile Data Communication" Kazunori Obata et al., B–5–88, Sep. 7, 1998.

Nikken Communications, "Browsers for Portable Telephones" pp. 130–137, Dec. 7, 1998.

1998 IEICE Society Conference, "TCP Gateway Suitable for Asymmetric Wireless Link" Noriyasu Kato et al., Sep. 7, 1998.

Globecome'97, (Nov. 3–8, 1997), vol. 3, pp. 1953–1957, Fieger A et al., "Evaluation of migration support for indirect transport protocols".

"Dod Standard, Transmission Control Protocol", *Information Sciences Institute, University of Southern California,* Jan. 1980, 8 Pages.

* cited by examiner

FIG.10
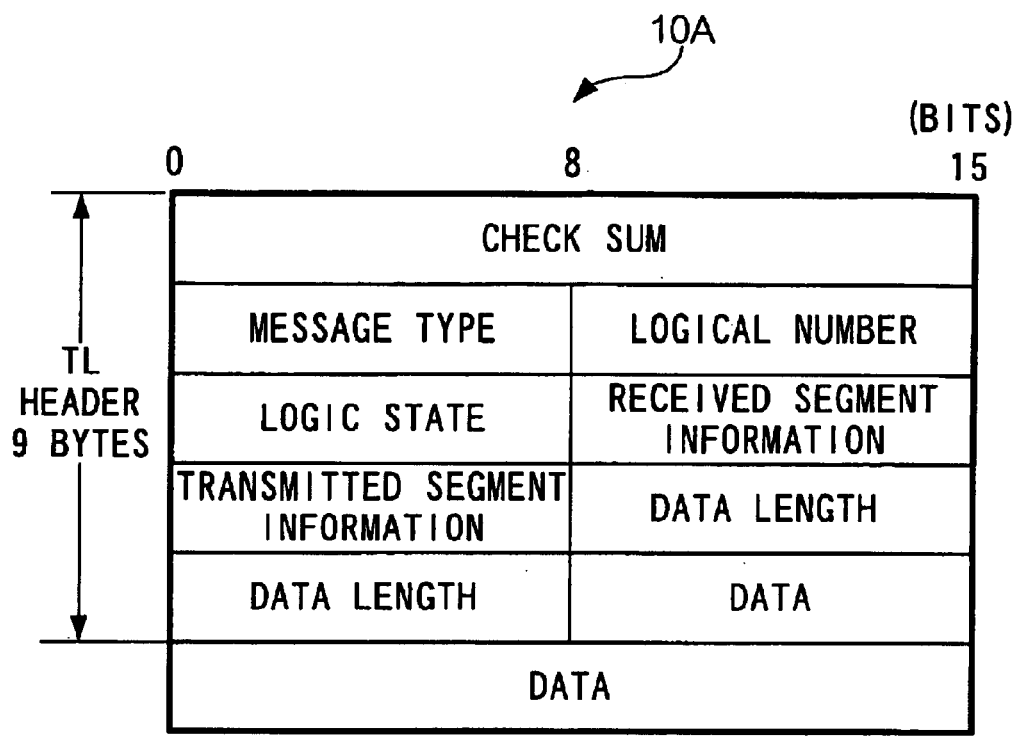
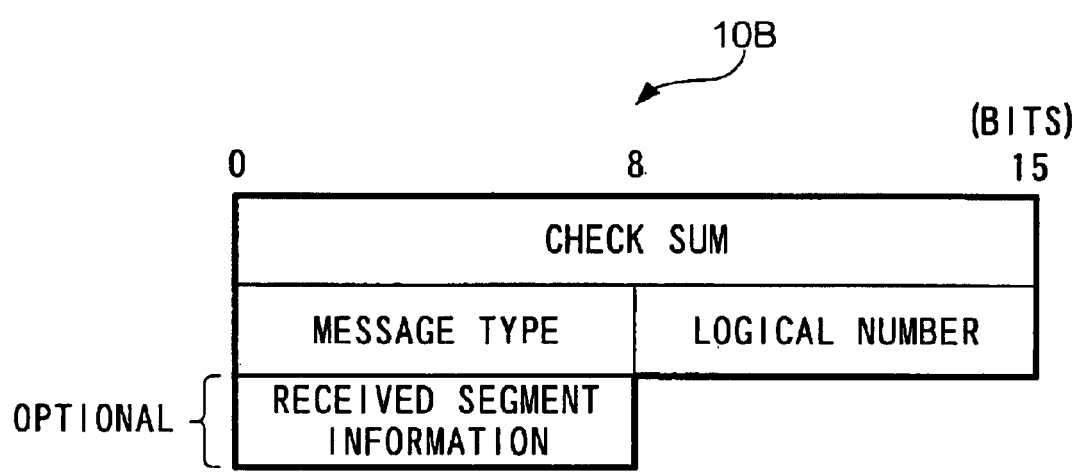

COMMUNICATION SYSTEM FOR MOBILE DEVICES

BACKGROUND OF THE INVENTION

1. Technical Field

The present invention relates to a communication systems and more particularly to a communication system suitable for use in an information distribution system providing information from at least one server apparatus to a plurality of user terminals via a network.

2. Background Art

The Internet provides content providers with an environment capable of delivering content to users around the world directly and at a low cost. In addition, the Internet provides users an environment that allows content from around the world to be enabled for use in a standard user interface. As development, provision and use of content providing services that make use of the Internet become more prevalent, the vast amount of content available on the Internet increases daily. As a result, the ease of access to the Internet has become an important consideration in the development of content distribution services.

With the increasing popularity of the Internet, transparent system architectures employing internet technologies within LANs (Local Area Networks) have become commonplace. One basic constituent of many "Internet technologies" is the communication protocol, specifically TCP/IP (Transmission Control Protocol/Internet Protocol). In fact, a large number of networks currently employ TCP/IP.

Data communications according to TCP/IP are based on an OSI layer model (OSI Reference Model). The OSI reference model is a seven layer model used to model data relayed between a transmitter and a receiver. On the transmission side, data is relayed by sequentially adding headers for each layer to actual data from a higher layer to form packets. The packets are transmitted to the reception side. At the reception side, the transmitted packets are processed sequentially from the lowest layer (physical layer) to the highest layer. During processing in each layer, packets supplied from a lower layer are separated into data and a header corresponding to that layer. The content of the header is analyzed, and the data is handed to a next higher layer.

An example of the packet structure obtained by the processing in each layer on the transmission side shall be explained with reference to FIGS. 12–14. In this example, the transmission side and reception side are connected one-to-one using a PPP (Point-to-Point Protocol), as in general dial-up connections.

FIG. 12 shows the structure of an example TCP segment which is a packet that has undergone processing in the fourth layer (transport layer). The TCP segment is composed of a TCP header and data. The TCP header is composed of a basic header (20 bytes) and an optional header. The basic header includes information such as a source port number, destination port number, sequence number, acknowledgment number, code bits and window size. Additionally, the data is composed of actual data and a header added by processing at an upper layer equal to or higher than the fifth layer (session layer).

FIG. 13 shows the structure of an example IP datagram which is a packet that has undergone processing in the third layer (network layer). The IP datagram is composed of an IP header and data. The IP header is composed of a basic header (20 bytes) and an optional header. The basic header includes information such as a source IP address, a destination IP address, a service type, a packet length, and a protocol number. Additionally, the data is composed of actual data and a header added by processing on a layer equal to or higher than the fourth layer (transport layer) such as TCP, UDP (User Datagram Protocol) or ICMP (Internet Control Message Protocol).

FIG. 14 shows the structure of an example PPP frame which is a packet that has undergone processing in the second layer (data link layer). The numbers in parentheses in FIG. 14 are given in units of bytes. The illustrated PPP frame consists of a PPP header (5 bytes), data, and a PPP footer (3 or 5 bytes). The PPP header includes a flag, an address, a control, and a packet protocol identifier such as LCP (Link Control Protocol), IPCP (Internet Protocol Control Protocol), IP or IPX (Internetwork Packet Exchange). In addition, the data includes actual data and a header (including the above-mentioned TCP header and IP header) added by processing at least one layer equal to or higher than the third layer (network layer). The PPP footer includes an FCS (Frame Check Sequence) and a flag. The MTU indicated in FIG. 14 refers to the maximum transmission unit.

As described above, on the transmission side, the actual data to be transmitted is processed by procedures corresponding to each layer in the OSI layer model from the highest layer to the lowest layer. As such, a header corresponding to the processing of each layer is sequentially added to the actual data.

FIG. 7 illustrates an example packet 7A that has undergone all of the processes on the transmission side and is ready to be transmitted. As shown in FIG. 7, the packet 7A has a header composed of a 5-byte PPP header, a 20-byte IP header and a 20-byte TCP header. The header therefore includes a total of 45 bytes that are added at the beginning of the application data (if it is assumed that there are no optional headers). In addition, a 3- or 5-byte footer is added at the end of the application data. The size of the application data is, for example, 500 bytes and can be expanded to a maximum of 1460 bytes.

The operating sequence for performing packet communications according to TCP/IP shall now be explained with reference to the example process flow diagram of FIG. 15.

At S1, an LCP set up request message requesting set up of the LCP is sent from the data transmission side to the data reception side, or from the data reception side to the data transmission side. An acknowledgment response message (LCP Set Up Ack) corresponding to the LCP set up request is then sent from the party receiving the LCP set up request message to the other side at S2. At S3, a Challenge Message to perform identification at the other side is subsequently sent from the data reception side. Upon receipt of the challenge message on the data transmission side, a response message is sent out at S4. At S5, a Success Message to indicate that the identification on the other side has succeeded is then sent out from the data reception side to the data transmission side.

Once this sequence of operations is complete, an IPCP set up request message is sent from the data reception side to the data transmission side at S6. In addition, an IPCP set up request message is sent from the data transmission side to the data reception side at S7. At S8, an IPCP set up request message or a negative response message (Nak) is sent from the data reception side to the data transmission side. Upon receiving the IPCP set up request message, an acknowledgement response message (IPCP Set Up Ack) is sent from the data transmission side at S9.

At S10 an IPCP set up request message is then sent from the data transmission side to the data reception side. Upon receiving the IPCP set up request message, an acknowledgment response message is sent from the data reception side at S11. In this way, a PPP link is established between the data transmission side and the data reception side.

At S12, an IP+TCP Request message requesting establishment of an IP data link and establishment of a TCP connection is then sent from the data transmission side to the data reception side. Upon receipt of the IP+TCP request message, an IP+TCP acknowledgment response message is sent from the data reception side at S13. At S14, the data transmission side receives the IP+TCP acknowledgement response message and sends out a reply IP+TCP acknowledgment response message indicating that the IP+TCP acknowledgment response message has been received. In this way, a TCP connection is established between the data transmission side and the data reception side. The transmission and reception of actual data in the form of packet data is then initiated.

Packet data is first transmitted from the data transmission side by means of HTTP (HyperText Transfer Protocol) at S15. At S16, the data reception side, receives the packet data and sends out an acknowledgment response message. Then, depending on the size of the data being transmitted (e.g. the number of packets needed), the operations of S15 and 16 are repeatedly performed until the transmission of the packet data is completed.

At S17, a transmit finish message indicating that the transmission of the packet data has been completed is sent out from the data transmission side. The data reception side, upon receiving the transmit finish message, sends out an acknowledgment transmit finish message at S18. At S19 a reception complete message that the reception of data has been completed is sent out from the data reception side. Upon receipt of the reception complete message, the data transmission side sends out an acknowledgment reception complete message at S20.

In this way, the TCP session is terminated. At S21, to disconnect the PPP link, a Termination Request message requesting termination of the PPP link is sent out from the data transmission side. Upon receiving the termination request message, an acknowledgment termination request message is sent from the data reception side at S22. In this way, the PPP link is first disconnected. Upon disconnection of the PPP link, the channel is disconnected at S23 and the overall operation is completed.

In recent years, mobile communications have spread widely, and mobile data communications using mobile terminals is increasing in popularity. In the field of mobile data communications, it has become possible for a mobile user to access the Internet using a mobile terminal. Accordingly, provision for user-friendly Internet access services for mobile users is desired. Providing such mobile Internet access services using packet communications according to TCP/IP as described above, however, creates undesirable performance and operability issues.

With TCP/IP, as described above, the header of a packet is added sequentially by each layer and encapsulated. As a result, the overall header size becomes large. The header size is particularly large in comparison to the data when the actual data size is small. For example, when transferring about 500 bytes of data during mobile communications, the header size is about ten percent of the data size. Among the information contained in the header there are also fields which are left unused.

The number of signals exchanged between the data transmission side and reception side using TCP/IP is also relatively large in the operating sequences during establishment of connections prior to actually transmitting data. In the example shown in FIG. 15, a total of 14 steps from S1 to S14 are performed. Consequently, as the number of users accessing a network increases, network traffic increases dramatically and the data transfer rates may drop. In addition, since the mobile user is charged for the operations (steps S1–S14) prior to data transmission and reception, the economic burden on the mobile user may also become large.

Although these processes also occur in connections to the Internet via fixed networks, they are especially burdensome in mobile communication where data transmission capability (e.g. bandwidth) is relatively low in comparison to communication via fixed networks. In addition, since TCP/IP is relatively complex, mobile terminals with computing capability to rapidly process TCP/IP may be larger, heavier, and more expensive. Currently, mobile terminals with rapid processing capability (such as a personal digital assistant (PDA), etc.) simply include a portable computer and are therefore received well only in small markets. In contrast, mobile stations that are used for voice communication are designed for portability, operability and ease of use. The form and price of mobile stations for voice communication are believed to already be well-received in a broad market due to their general usefulness and high degree of popularity.

As mentioned above, various types of content capable of meeting the needs of various users already exists on the Internet. Due to the steady increase in the amount of content, devices that are already operated by various users such as mobile stations for voice communication are desired as devices for accessing the Internet. Thus, services for accessing the Internet using mobile stations for voice communication that have the capability to rapidly process TCP/IP will be well-received in a wide market. Even without taking into consideration the problem of data transmission capability in mobile communications.

One might also consider having the content providing side develop content that is customized to the data processing power of mobile stations for voice communication, and/or the data transmission capability of mobile communications. The development of this type of customized content may place a heavy burden on the content providing side. Accordingly, it is predicted that only a small amount of content with uses that are restricted to mobile stations for voice communication as compared to the content of the Internet will be available to the user.

From the above description, it is believed that the foundation of mobile data distribution is in the combination of mobile stations with voice communication with the Internet. In order to achieve this combination, it is necessary to develop efficient communication technologies which enable mobile users to effortlessly use content from the Internet using mobile stations with voice communication.

BRIEF DESCRIPTION OF THE DRAWINGS

FIG. 10 are tables showing the structure of example packets transmitted during data transmission and reception, showing the structure of a packet containing actual data and showing the structure of a packet transmitted in acknowledgment response when the packet containing actual data has been transmitted.

DESCRIPTION OF THE PREFERRED EMBODIMENTS

The present invention shall be described in detail with reference to the attached drawings.

1. Structure of Embodiment

1.1. System Structure

Figure 1:
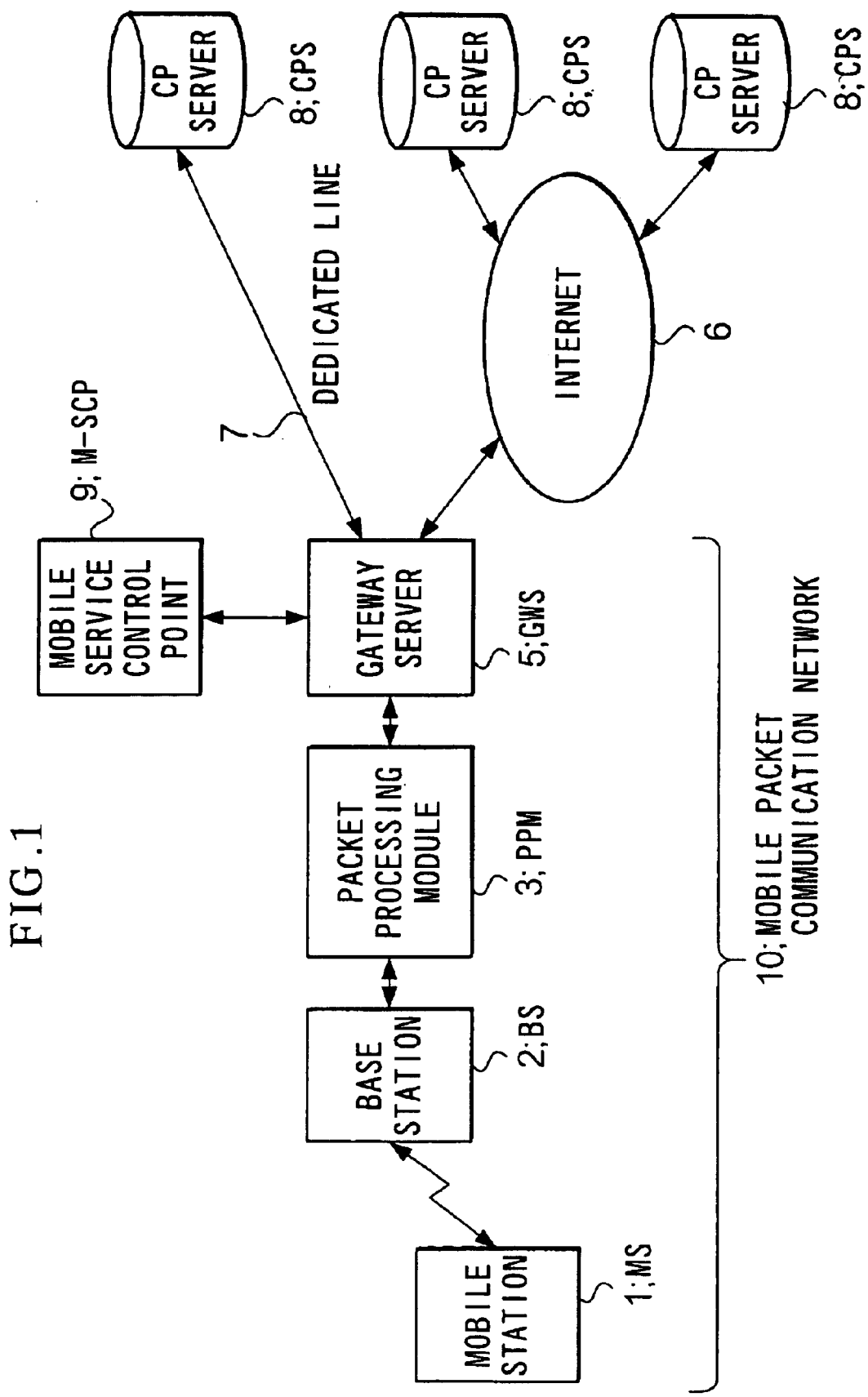
FIG. 1 is a block diagram showing the structure of an example communication system according to an embodiment of the present invention.

FIG. 1 shows the structure of a communication network system of the present embodiment. The communication network system comprises at least one MS (Mobile Station) 1, at least one BS (Base Station) 2, at least one PPM (Packet Processing Module) 3 and at least one GWS (GateWay Server) 5. At least one CPS (Content Provider Server) 8 is connected to the GWS 5 via the Internet 6 or a dedicated line 7. In addition, at least one M-SCP (Mobile Service Control Point) 9 is connected with the GWS 5. BS 2, PPM 3, GWS 5, M-SCP 9 and the interconnecting communication paths form a mobile packet communication network 10.

MS 1 is a terminal device which utilizes packet communication services of the mobile packet communication network 10. In addition to wirelessly communicating with the mobile packet communication network 10 shown in FIG. 1, the MS 1 may also wirelessly communicate with a mobile telephone network (not shown). The MS 1 may therefore also be capable of receiving mobile telephone service.

Figure 11:
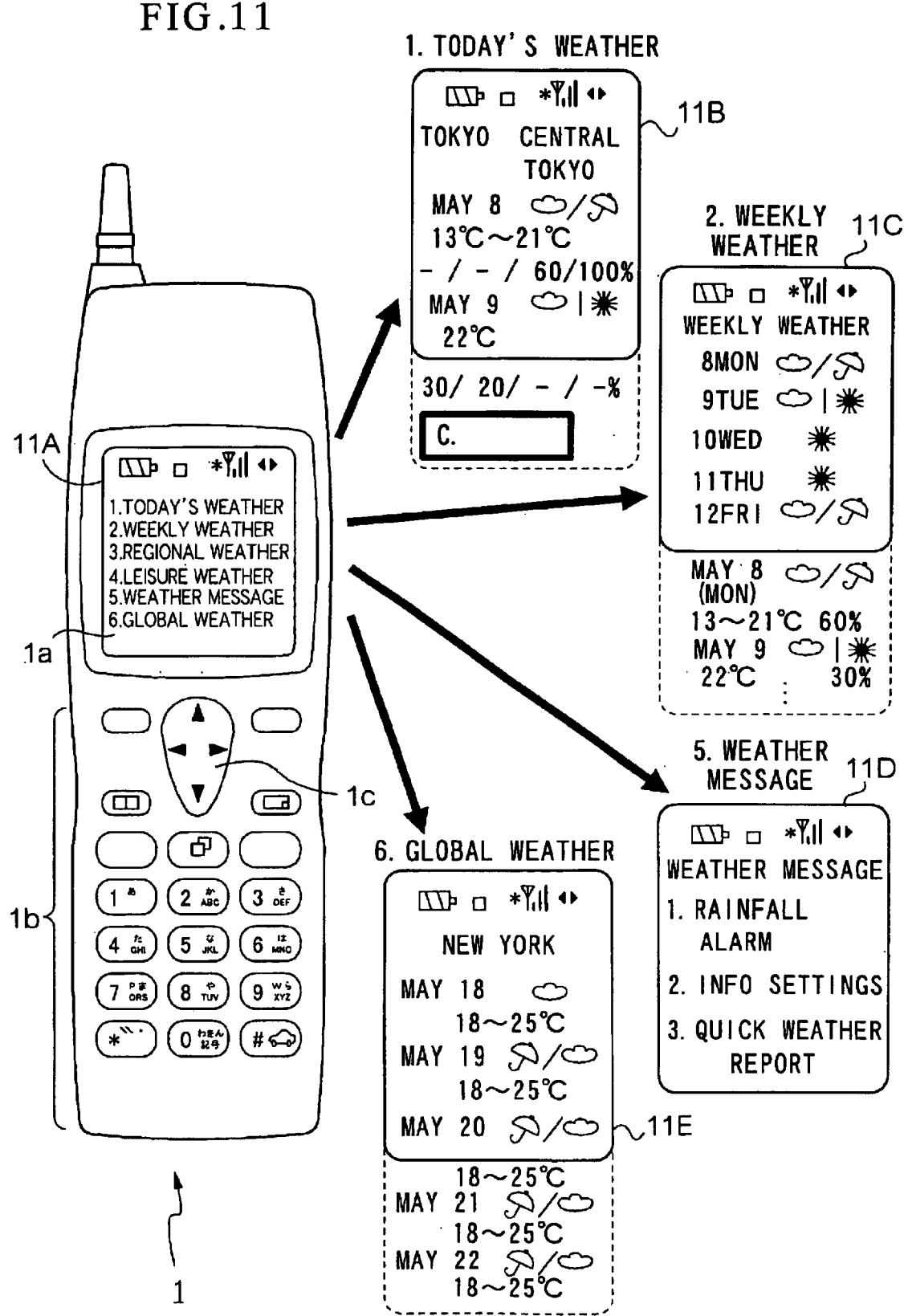
FIG. 11 is a diagram showing an example of the outward appearance of a mobile station contained in the communication system of FIG. 1 and showing a screen of an information display portion when the mobile station is providing the user with information.
Figure 12:
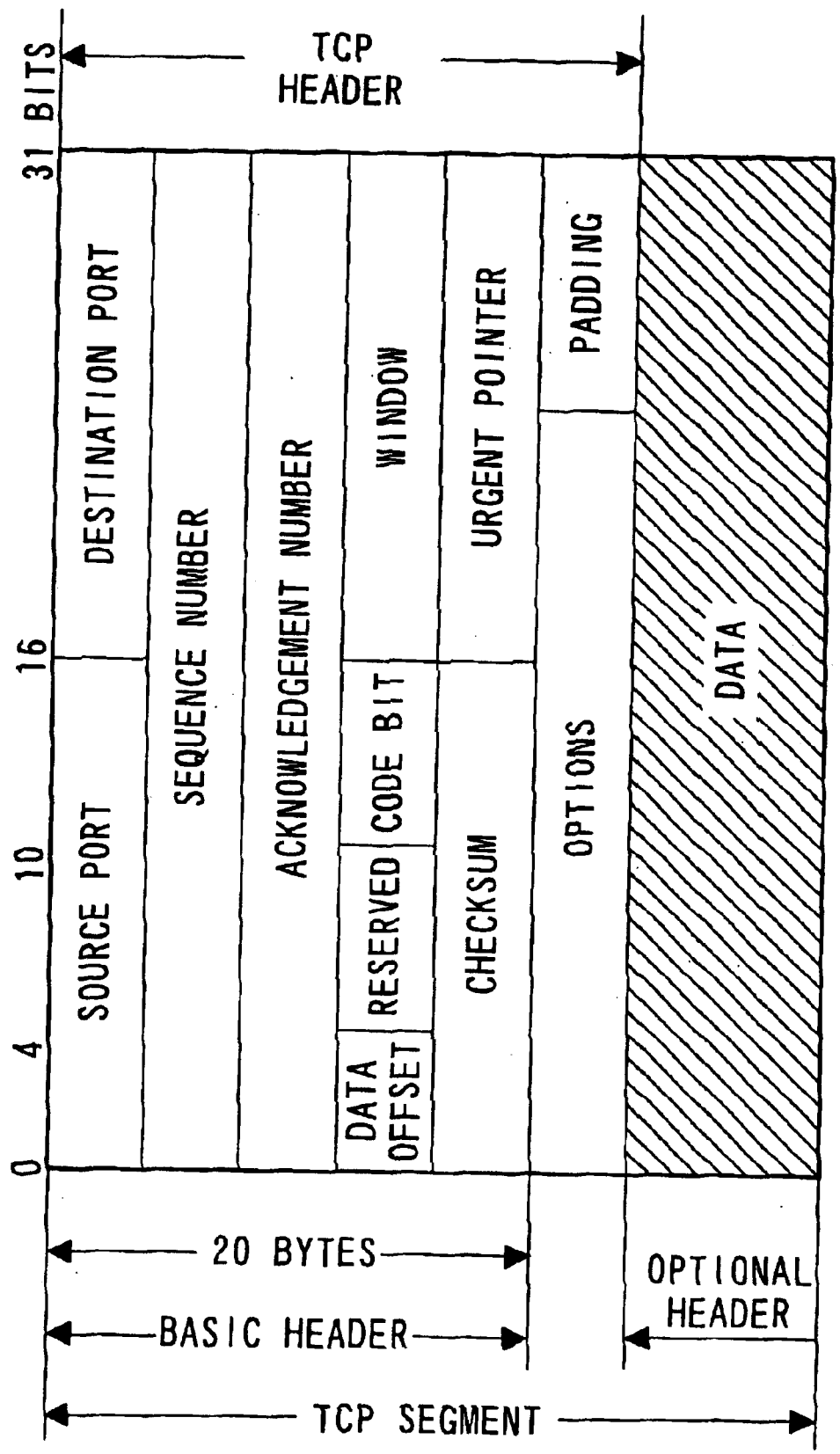
FIG. 12 is a table showing the format of an example TCP segment.
Figure 13:
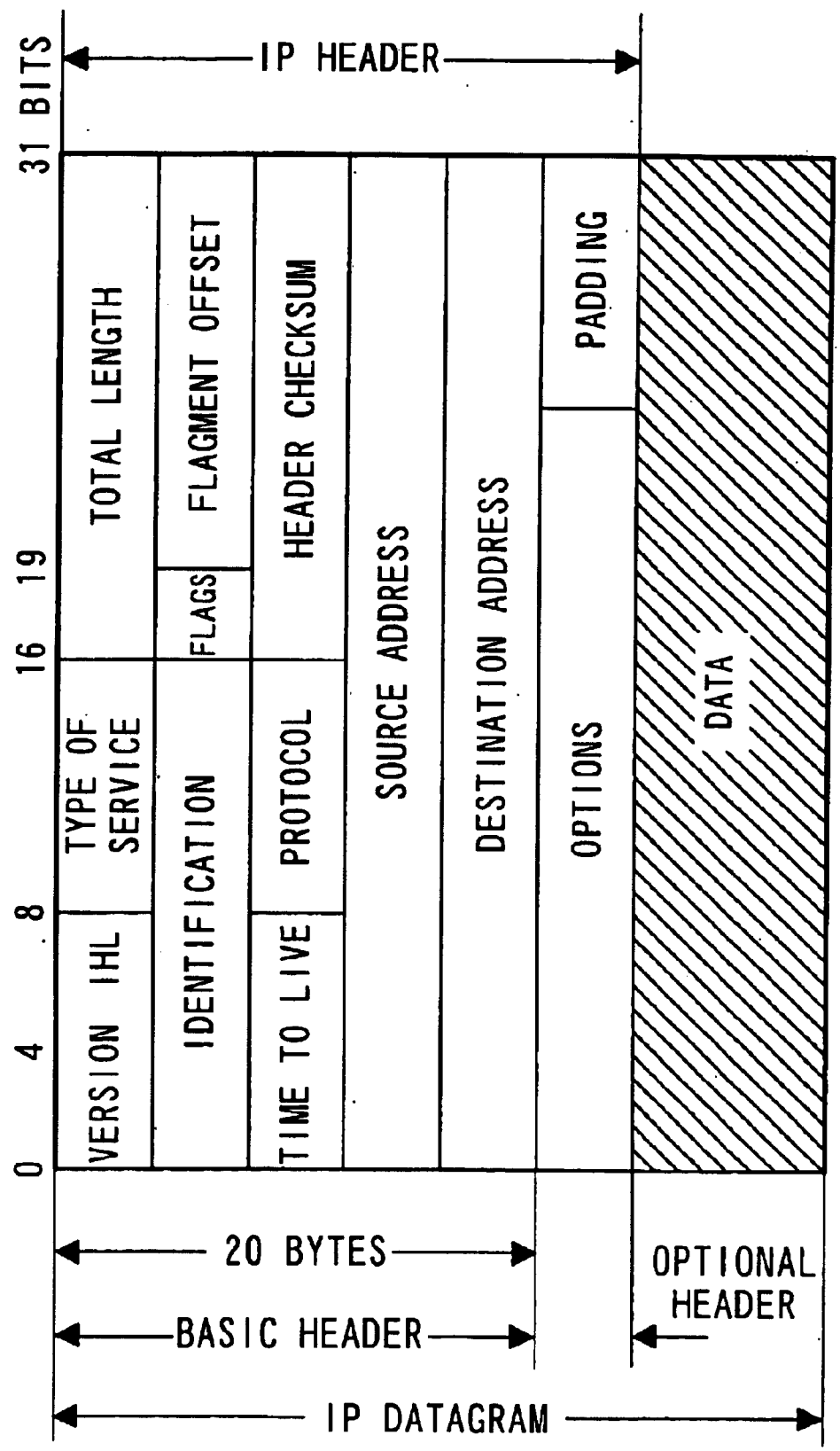
FIG. 13 is a table showing the format of an example IP datagram.
Figure 14:
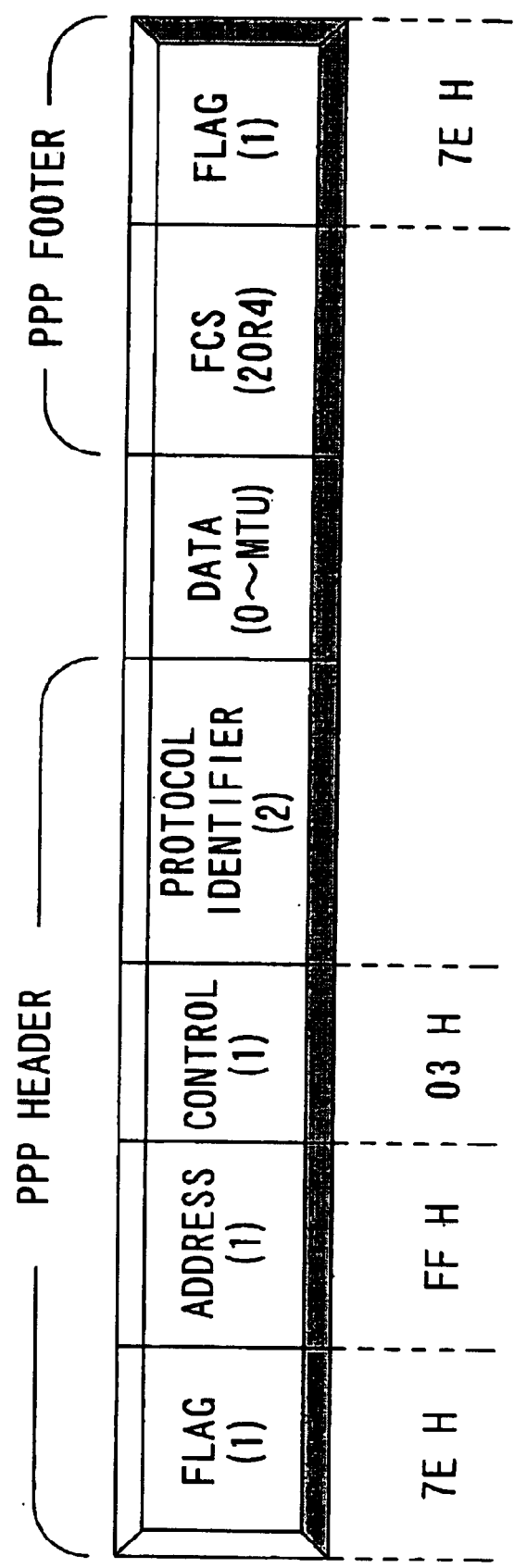
FIG. 14 is a table showing the format of an example PPP frame.

FIG. 11 shows an example of the outward appearance of the MS 1 and example screens displayed on the MS 1. The MS 1 may include an audio input/output portion (not shown) for the user to perform audio communications. In addition, the MS 1 may include a radio portion for performing wireless radio communications with BS 2 (FIG. 1). Further, the MS 1 may include an information display portion 1a. The information display portion 1a may include a liquid crystal panel or the like.

An operating portion 1b may also be included in the MS 1 for performing information input operations such as number entry or character input. The MS 1 also includes an internal microcomputer for controlling these portions. Additionally, the MS 1 contains software that may be generally referred to as a browser for viewing document data. The browser is software for displaying a dialog screen based on data in a content format such as HTML data format. The data (hereafter referred to as HTML data) may be supplied from the CPS 8. The CPS 8 may be operated by a content providing business to communicate content over the mobile packet communication network 10.

The MS 1 may display for the user various types of information on the information display portion 1a utilizing the above-mentioned browser. An example information display portion 1a can display 8 (characters)×6 (lines) of information. In other examples, it is possible to have more than 8 characters horizontally and more than 6 lines vertically, depending on the area of the information display portion 1a and the character size.

During operation, the MS 1 may perform a variety of functions and/or provide a variety of data. For example, when the user pushes an "information" key on the operating portion 1b, an initial screen 11A may provide the user with information relating to a weather forecast. The initial screen 11A is displayed on the information display portion 1a. By operating a jog dial key 1c, the user can select from a weather forecast menu of "1"–"6" in the initial screen 11A. If, for example, the user selects "1", a screen 11B showing today's weather is displayed in the information display portion 1a.

If the user selects "2", then a screen 11C showing a weekly weather forecast is displayed on the information display portion 1a. If the user selects "5", then a weather message submenu screen 11D is displayed. The weather message submenu screen 11D may be used to select information such as a rainfall alarm or a quick weather report. Furthermore, if the user selects "6", then a world weather forecast screen 11E is displayed. Text-based information may therefore be displayed on the information display portion 1a under control of the browser. The text-based information may be presented in a form that is easy for the user of the MS 1 to see and control.

In FIG. 1, the BS 2 may be positioned according to a wireless radio zone. The wireless radio zone provides a communication area, such as a geographic area with a determined radius such as about 500 meters. A BS 2 may perform radio communications with one or more MS 1 that are present in the wireless radio zone. In the mobile packet communication network 10, a plurality of the BS 2 may be geographically positioned to form a plurality of wireless radio zones.

The PPM 3 is a computer-based system that may operate in a packet subscriber switching station. The PPM 3 is capable of accommodating a plurality of BS 2. The PPM 3 may receive packet switching requests from the MS 1 via the BS 2. In addition, the PPM 3 may relay packet switching within the mobile packet communication network 10.

The GWS 5 is a computer-based system that may operate with a mobile packet gateway switching station. The GWS 5 may interconnect the mobile packet communication network 10 with another network such as the Internet 6. As shall be explained later, the GWS 5 may also maintain a wireless communication path (a radio-oriented interval) between the MS 1 and the GWS 5. In addition, a wireline communication path (a wire-oriented interval or landline communication path) may be maintained by the GWS 5 between the GWS 5 and the CPS 8. Accordingly, the GWS 5 operates as a relay between the MS 1 and the CPS 8. Additionally, a plurality of the GWS 5 may form a server group. A proxy server may also be included in the server group. Further, the GWS 5 may perform various types of control to enable packet communications between the MS 1 and CPS 8.

Enabling packet communications involves translation between a first communication protocol and a second communication protocol. The first communication protocol is a simplified protocol hereafter referred to as "simplified protocol TL" or "TL". The simplified protocol TL is used in wireless communication paths within wireless communication networks (radio-oriented interval). The second communication protocol is a server based network communication protocol such as TCP. The second communication protocol is used in wireline communication paths within wireline (or landline) networks (wire-oriented interval) and is hereafter referred to as "TCP/IP protocol."

The CPS 8 is a server-based system that may be operated by a content provider business. The CPS 8 may supply the GWS 5 with content. The content may be provided to the users of the MS 1 in a content format such as HTML data format. The content may be provided via the Internet 6 or a dedicated line 7. In addition, the GWS 5 may include a server for the mobile packet communication network 10 to provide content to the MS 1.

The M-SCP 9 may manage subscriber information and perform processing relating to packet registration. When packet communications begins, packet registration may be performed by the M-SCP 9. When packet communication ends, packet deregistration may be performed by the M-SCP 9. Billing information for the packet communications may be recorded in the PPM 3 and the GWS 5. The billing information may be transferred at a predetermined timing to a billing center such as a call toll accounting center (not shown).

1.2. Protocol Structure

In the above-described communication system, the devices employ protocol structures in order to perform data communications between the MS 1 and the CPS 8.

Figure 2:
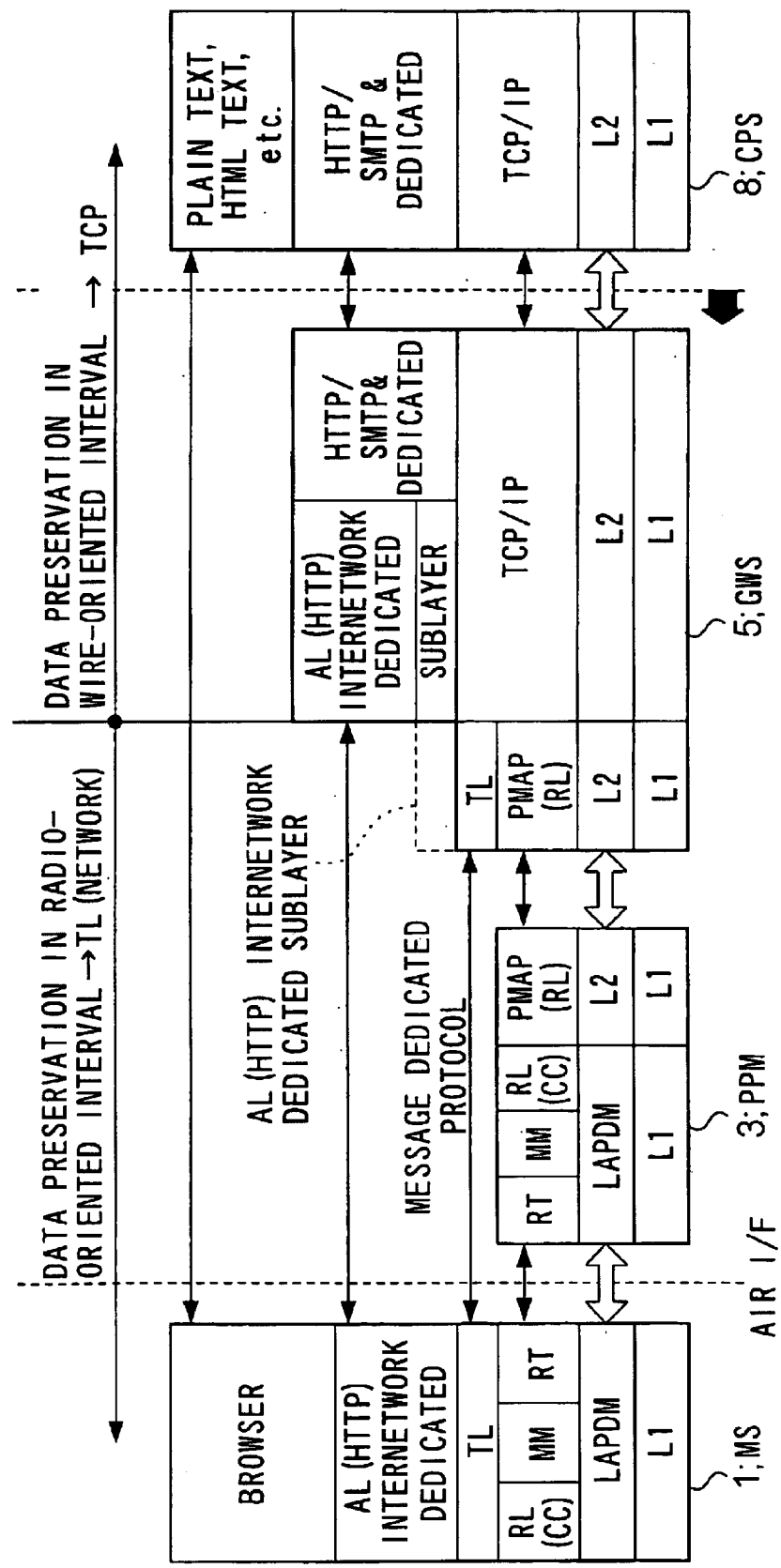
FIG. 2 is a block diagram showing an example protocol structure of the communication system illustrated in FIG. 1.
Figure 3:
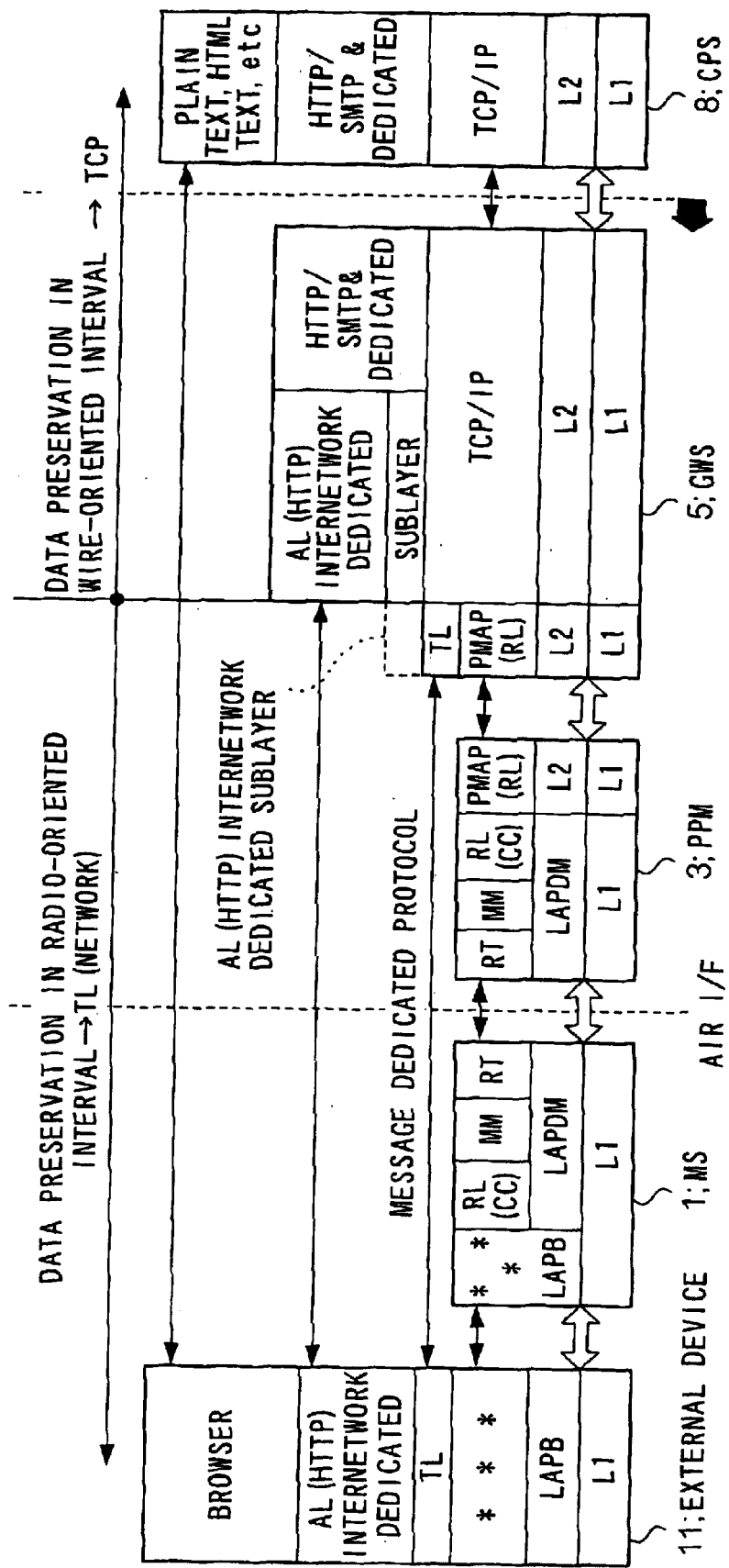
FIG. 3 is a block diagram showing another example protocol structure of the communication system illustrated in FIG. 1.

FIGS. 2 and 3 express schematically example protocol structures of the present embodiment based on an OSI layer model. FIG. 2 shows a protocol structure for a case where information is received from the CPS 8 by the mobile station (MS 1). FIG. 3 shows a protocol structure for a case where information is received from the CPS 8 by an external device 11, such as a portable information terminal or car navigation device that is coupled with the MS 1.

In the example protocol structures shown in FIGS. 2 and 3, the left side, of the GWS 5, i.e. the PPM 3 and the MS 1 (and external device 11) are in wireless communication or in the radio-oriented data communication interval. In a wireless communication path, a radio communication protocol and the simplified protocol TL of the present embodiment are used. On the other hand, the right side of the GWS 5, i.e. up to the CPS 8 is a wire line communication path or the wire-oriented communication interval. In the wire line communication path, the general-purpose protocol TCP/IP (second communication protocol) is used.

The example protocol structure shown in FIGS. 2 and 3 shall now be described in sequence from the bottom layers to a top layer based on the OSI layer model.

1.2.1. First Layer (Physical Layer)

In FIGS. 2 and 3, L1 indicates a physical layer protocol. In the physical layer protocol of the wireline communication path (wire-oriented interval), the frequencies used, transmission power, modulation method, access method and other wire line-related communication parameters are defined. The wire line-related communication parameters are defined in order to ensure that the transmission of bit sequences is performed using communication lines composed of physical media such as dedicated lines, public telephone lines or ISDN.

On the other hand, in the physical layer protocol of the wireless communication path (radio-oriented interval), the packet communication channels are defined on the basis of the channel structure of the mobile packet communication network 10 (FIG. 1), such as a personal digital communication (PDC) system. The arrangement/structure of physical channels for packet communication, the signal coding method and signal transmission method for transmitting signals using the physical channels for packet communication are defined.

1.2.2. Second Layer (Data Link Layer)

In FIGS. 2 and 3, L2 indicates a data link layer protocol. In the data link layer protocol of the wireline communication path (wire-oriented interval), the procedures and interfaces for performing transparent and highly reliable data transmissions between nodes are defined. The procedures and interfaces may be defined using bit sequence transmission functions provided in the physical layer. Data links are established using PPP as the protocol of this data link layer.

On the other hand, in the data link layer protocol of the wireless communication path (radio-oriented interval), LAPDM (Link Access Procedure for Digital Mobile channel) is used between the MS 1 and PPM 3. The LAPDM is used for physical control channels and physical communication channels with functions added to perform packet communications efficiently so as to enable use on physical channels for packet communications. Furthermore, in the case of FIG. 3, an LAPB (Link Access Procedure Balanced) is used between the MS 1 and the external device 11.

1.2.3. Third Layer (Network Layer)

The network layer protocol in the wireless communication path (wire-oriented interval) is composed of an IP (Internet Protocol). This IP performs routing and supplies HTML data transmitted from the CPS 8 to the GWS 5 via the Internet 6. Additionally, in the wireless communication path (radio-oriented interval), PMAP (Packet Mobile Application Part) may be used between the PPM 3 and GWS 5. The PMAP is defined as a message format for transmitting and receiving user packets between nodes in a PDC-P network.

The network layer protocol for communications between the MS 1 and the PPM 3 may be composed of RT (Radio frequency Transmission management), MM (Mobility Management) and CC (Call Control). Here, RT performs functions relating to management of radio resources (including management of physical channels for packet communications). In addition, such functions as selection of radio zones and setting, maintenance, switching and disconnection of radio channels are performed by RT. MM performs functions relating to mobile station (MS 1) movement support. The functions include position registration and identification. CC performs functions relating to channel call connection control. Such functions include setting, maintenance and release of calls. The detailed operations of these network layer protocol functions are described in "Digital Car Telephone System Standards RCR STD-27F". These functions work cooperatively to perform such control as simultaneous standby control, communication initiation control, packet transfer control, channel switching control, periodic registration control and communication termination control.

1.2.4. Fourth Layer (Transport Layer)

The transport layer protocol of the wireline communication path (wire-oriented interval) is composed of TCP. The transport layer protocol is for supplying HTML data transmitted from the CPS 8 to the GWS 5 via the Internet 6.

The transport layer protocol is also for communications between the MS 1 and GWS 5 over the wireless communication path (radio-oriented interval). The transport layer protocol over the wireless communication path is composed of the simplified protocol TL. The TL provides a connection-type service for performing highly reliable end-to-end communications that make communications by virtual circuits possible. As a result, higher level applications can provide dialog-type services as if a physical point-to-point link has been established with a communication partner (this is known as a "logical connection"). The TL can set up a plurality of logical connections simultaneously. The communication protocol of the mobile packet communication network 10 (FIG. 1) is composed in such a way that the TL directly resides on the bearer of the mobile packet communication network 10.

1.2.5. Fifth Layer (Session Layer)

Over the wireline communication path (wire-oriented interval), HTTP may be used for browser display. In addition, SMTP may be used for electronic mail distribution. HTTP and SMTP may be used on the session layer and presentation layer between the GWS 5 and the CPS 8. Between the MS 1 and the GWS 5, communications may be performed using HTTP by means of a virtual circuit that is explained later. In addition, in the application layer, data communications are performed between the MS 1 operating a browser and the CPS 8 possessing data of various formats such as plain text, HTML, GIF, and the like.

1.2.6. Sixth Layer (Presentation Layer)

The sixth layer may include HTTP as an Internet work-dedicated protocol between the MS 1 and the GWS 5. Between the GWS 5 and the CPS 8, the sixth layer may include HTTP/SMTP protocols.

1.2.7. Seventh Layer (Application Layer)

The application layer of the MS 1 is composed of a browser having the function of Internet browsing software. The application layer of the CPS 8 includes data such as plain text, HTML, GIF, and the like. As previously discussed, the CPS 8 operates as a server to provide the user of the MS 1 with various content.

2. Operation of the Embodiment

The overall operating sequence of a communication system including the wireline communication path (wire-oriented interval) and wireless communications path (radio-oriented interval) employing a protocol structure of this type shall be explained for the case of performing packet communications. In the following description, the structures of the packets exchanged in the wireless communication path (radio-oriented intervals) shall be referred to as the "occasion demands." In addition, it should be understood that each of the packets are transmitted in the form of a signal that are each messages.

2.1. Operating Sequence for Packet Registration

Figure 4:
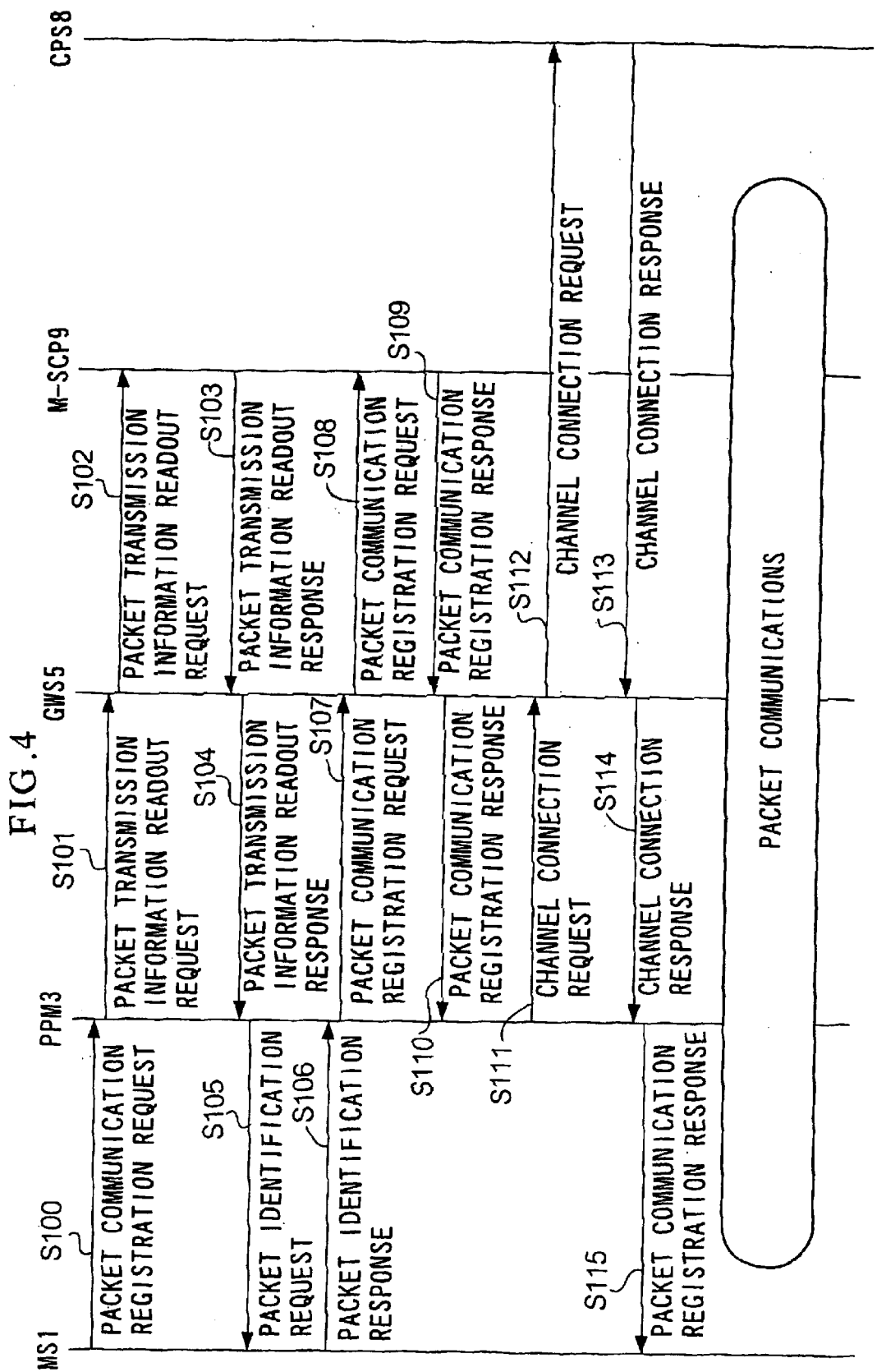
FIG. 4 is a flow diagram showing an example operating sequence prior to packet communications in the communication system illustrated in FIG. 1.

When a user presses the "information" key in MS 1, the operating sequence for packet registration shown in FIG. 4 is executed. At S100, a packet communication registration request is issued from the MS 1 side toward the PPM 3 in the form of a message (or signal). Upon receiving the registration request, the PPM 3 sends the GWS 5 a message requesting readout of packet origination information at S101. The packet origination information indicates whether or not the packet originator is a packet subscriber. The packet origination information readout request message is transmitted through the GWS 5 to the M-SCP 9.

The M-SCP 9 searches for subscriber information corresponding to an originator ID included in the packet origination information readout request message to determine whether or not the user of MS 1 is a packet service subscriber, and sends out a packet origination information readout response message at S103. At S104, the packet origination information readout response message is transmitted through the GWS 5 to the PPM 3. Upon receiving the packet origination information readout response message, the PPM 3 sends the MS 1 a packet identification request message at S105. At S106, a packet identification response message in response to the packet identification request signal is returned from the MS 1 to the PPM 3.

A packet communication registration request message requesting registration of packet communications is transmitted from the PPM 3 through the GWS 5 to the M-SCP 9 at S107 and S108. At S109, the M-SCP 9 performs registration for initiating packet communication between the MS 1 and the wireless communication system, and returns a packet communication registration response message to the GWS 5. The packet communication registration request message is transmitted from the GWS 5 to the PPM 3 at S110.

Upon receiving the packet communication registration response message, the PPM 3 sends a channel connection request message requesting channel connection to the GWS 5 at S111. At S112, the GWS 5 receives the channel connection request message and sends a channel connection request message to the CPS 8. The CPS 8 returns a channel connection response message at S113. Upon receiving the channel connection response message, the GWS 5 sends the PPM 3 a channel connection response message at S114. At S115, the PPM 3 sends the MS 1 a packet communication registration response message.

2.2. Operating Sequence During Packet Communications

When the sequence of packet communication registration procedures ends, an initial screen such as the example shown in the previously discussed FIG. 11 is shown in the information display portion 1a of MS 1. The user may then operate the jog dial key 1c and select a menu number from the initial screen. Packet communications may then commence to display the content of the homepage at the URL linked to that menu number on the information display portion 1a.

Figure 5:
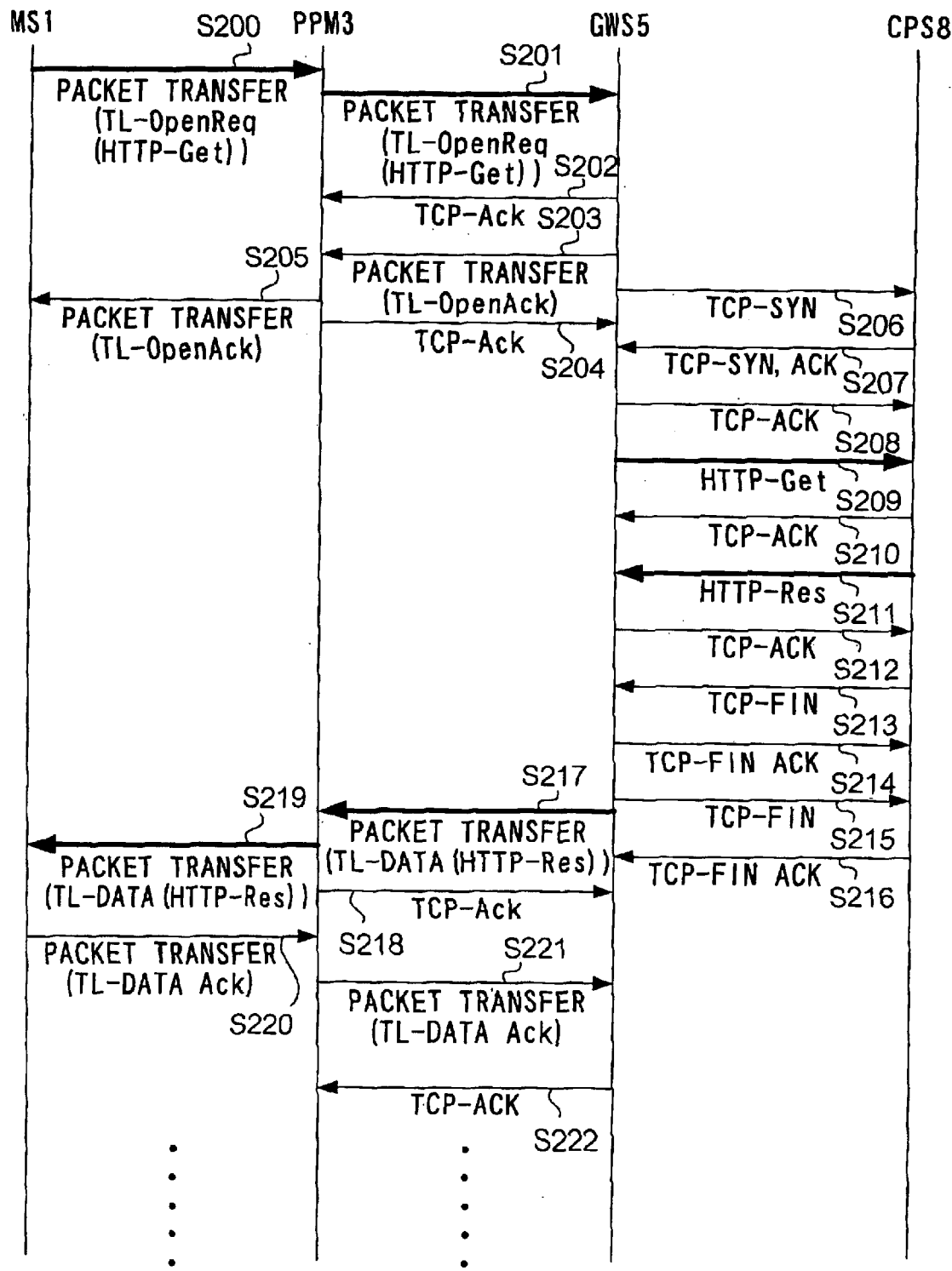
FIG. 5 is a flow diagram showing an example operating sequence during packet communications in the communication system illustrated in FIG. 1.

FIG. 5 shows an example operating sequence during packet communications.

At S200, the MS 1 sends out a first packet (TL-OpenReq packet). The first packet includes a connection setup request message (Open Request), the URL of the homepage which is to be accessed, and an HTTP-Get method. The HTTP-Get method is requesting transfer of the data required to display the content of the homepage on the information display portion 1a of the MS 1.

Figure 8:
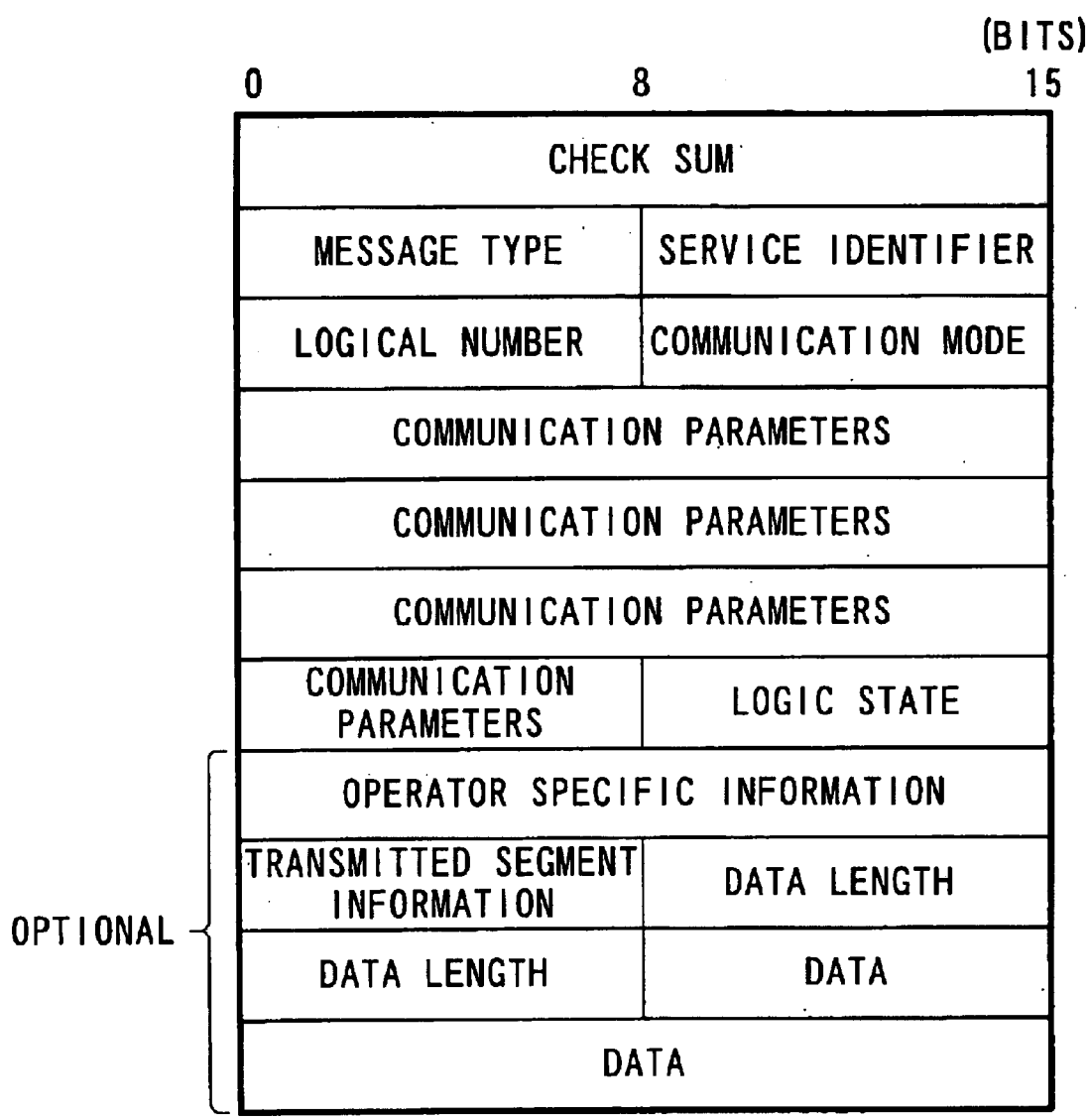
FIG. 8 is a table showing the structure of an example packet transmitted in a connection set up request.

FIG. 8 shows the structure of an example TL-OpenReq packet sent when requesting connection setup in the example of FIG. 5. In this packet, the field identified as "message type" includes information indicating that the message type is an "Open Request" message. The field identified as "data" contains data for the HTTP-Get method including the above-mentioned URL. The "logical number" field contains identification numbers for identifying the end-to-end connection established between the MS 1 and the GWS 5. The simplified protocol TL in the wireless communication path (radio-oriented interval) enables a plurality of simultaneous logical connections. Each logical connection is indicated in the field identified as "logical number." The logical number field is set on the mobile station side (MS 1).

The fields identified as "communication parameters" contain the data length and the amount of data that the MS 1 can receive in one packet. In addition, information such as timer values for the case where retransmission is to be performed may be included in the communication parameters fields. The MS 1 may store information relating to its own capabilities in the communication parameter fields of the transfer packet to be sent to the wireline network side.

As shown in FIG. 5, the TL-OpenReq packet may be sent through the PPM 3 to the GWS 5 at S201. The GWS 5 returns a packet containing an acknowledgement response message (TL-OpenAck) to the MS 1 through the PPM 3 (S203, s205). More specifically, on the wireline network side, a logical connection setup request message is received. The communication parameter information for the MS 1 side is analyzed. The communication parameters are determined and sent out, together with the acknowledgment response message (Open Acknowledge).

With the simplified protocol TL, the capabilities (the above-mentioned communication parameter values) of the MS 1 and the GWS 5 (the partner sides) are negotiated before setting up the logical connection and prior to data exchange. Thus, resources are used efficiently, and capacity control is performed by traffic gradients. A logical connection is then established between the MS 1 and the GWS 5 by means of these operations, and the exchange of packet data is completed.

Figure 9:
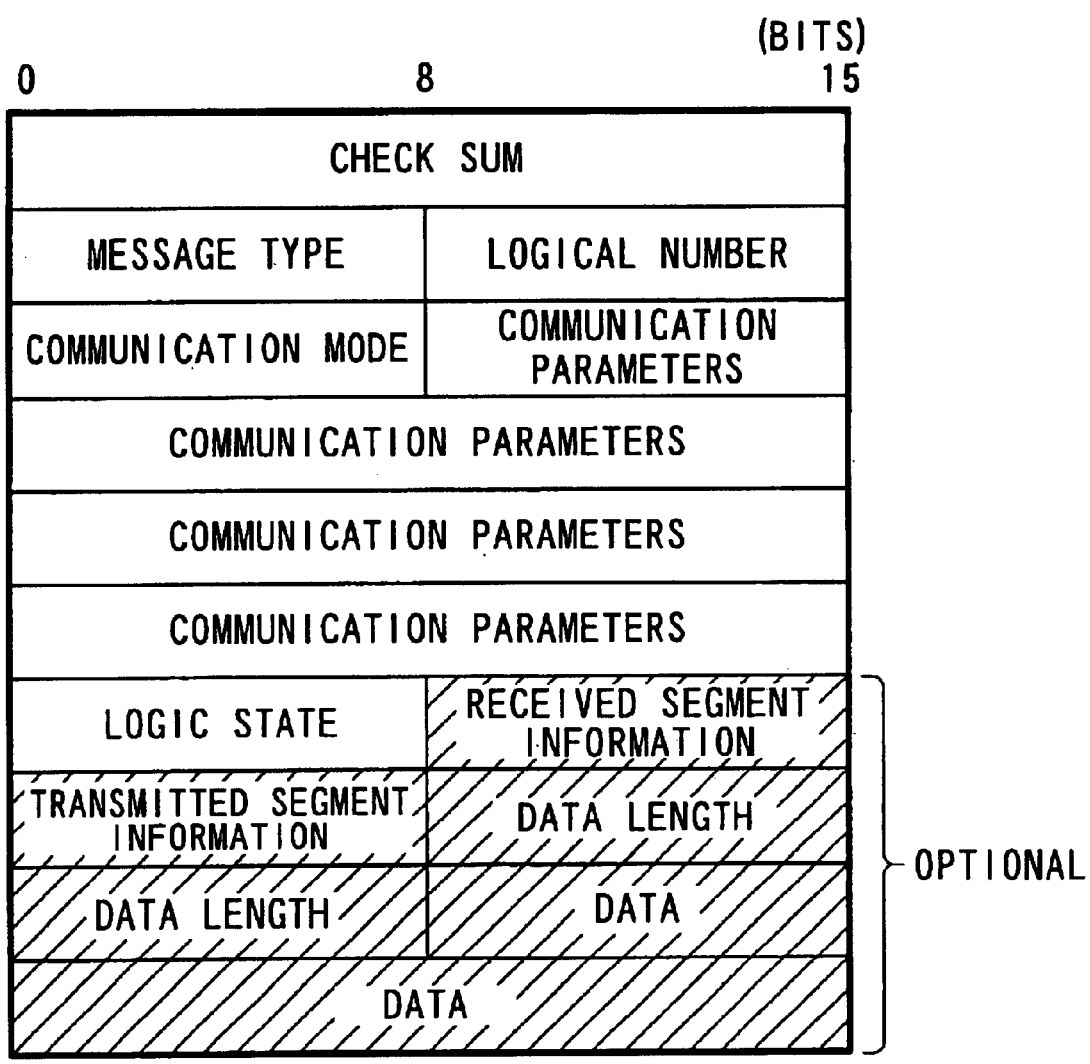
FIG. 9 is a table showing the structure of an example packet transmitted in acknowledgment response to a connection set up request of FIG. 8.

FIG. 9 shows the structure of an example TL-OpenAck packet sent as an acknowledgement response to a connection setup request message in the example of FIG. 5. In the TL-OpenAck packet, the field identified as the "message type" contains information indicating that it is an "Open Acknowledge" message. The field identified as "logical number" contains logical numbers designated at the time of the connection setup request.

Referring again to FIG. 5, the TL-OpenAck packet is transferred to the mobile station side (MS 1) at S205.

On the other hand, the following exchange occurs between the GWS 5 (which has received the TL-OpenReq packet) and the CPS 8 based on the TCP operating sequence. At S206, in order to establish a connection between the GWS 5 and the CPS 8, a segment to which a SYN flag has been set is sent from the GWS 5 to the CPS 8. As an acknowledgment response to indicate that the segment has been received, a segment with a SYN flag and an ACK flag is returned from the CPS 8 to the GWS 5 at S207. At S208, a segment having an ACK flag is sent from the GWS 5 to the CPS 8. A connection is established between the GWS 5 and the CPS 8 by means of a Three Way Handshake procedure that is part of the TCP.

At S209, an HTTP-Get segment containing the URL of the target homepage (obtained from MS 1 in step S201) is transmitted from the GWS 5 to the CPS 8. The CPS 8 returns an acknowledgment response signal indicating that the HTTP-Get segment has been received by the GWS 5 at S210. At S211, an HTTP-Res segment containing data from the homepage of CPS 8 as designated by the URL is transmitted from the CPS 8 to the GWS 5. A segment with an ACK flag indicating that the HTTP-Res segment has been received is returned from the CPS 8 at S212.

When data transfer by the HTTP-Res segment ends, the connection termination process is performed. At S213, a segment set up with a FIN flag is sent from the CPS 8 to the GWS 5. The GWS 5 returns an acknowledgment response segment indicating that the segment has been received at S214. At, this time, a similar connection termination process is performed from the GWS 5 at S215 and S216.

By means of this sequence composed of S206–S216, data from the homepage of the CPS 8 is supplied to the GWS 5. A packet (TL-DATA packet) containing data from the homepage of the CPS 8 previously supplied to the GWS 5 is transferred to the PPM 3 at S217. In FIG. 10, an example TL-DATA packet is indicated as packet 10A, and its structure is shown. In packet 10A, the field identified as the "message type" contains information indicating that the message type is a "Data" message. The fields identified as "data" includes the data from the homepage of the CPS 8.

Referring again to FIG. 5, the TL-DATA packet transferred to the PPM 3 is then transferred to the MS 1 at S219. As a result, data from the homepage selected by the user is transferred to the MS 1. The content corresponding to the menu number selected from the initial screen 11A (FIG. 11) by the user is displayed on the information display portion 1a.

The MS 1 returns an acknowledgment response packet (TL-DATA Ack) to the PPM 3 indicating that the TL-DATA packet has been received at S220. In FIG. 10, the TL-DATA Ack packet is shown as packet 10B, and its structure is shown. In packet 10B, the field identified as "message type" includes information indicating that the message type is "Data Acknowledge".

Referring again to FIG. 5, the TL-DATA Ack packet returned to the PPM 3 is transferred to the GWS 5 at S221.

The above-explained example is one where data transfer ends after a single packet transferred from the CPS 8 to the MS 1. In actual practice, the sequences between the PPM 3 and GWS 5 (S217, S221) and the sequences between the MS 1 and PPM 3 (S219, S220) are repeatedly performed in accordance with the amount of data supplied from the CPS 8. That is, if the amount of data supplied from the CPS 8 is 3 times the maximum amount of data capable of being received in one packet on the MS 1 side, then the data is divided and transferred to the MS 1 side in 3 packets. The processes of steps S217, S218, S221 and S222, and steps S219 and S220 are therefore performed 3 times.

2.3. Operating Sequence at Packet Communication Termination

Figure 6:
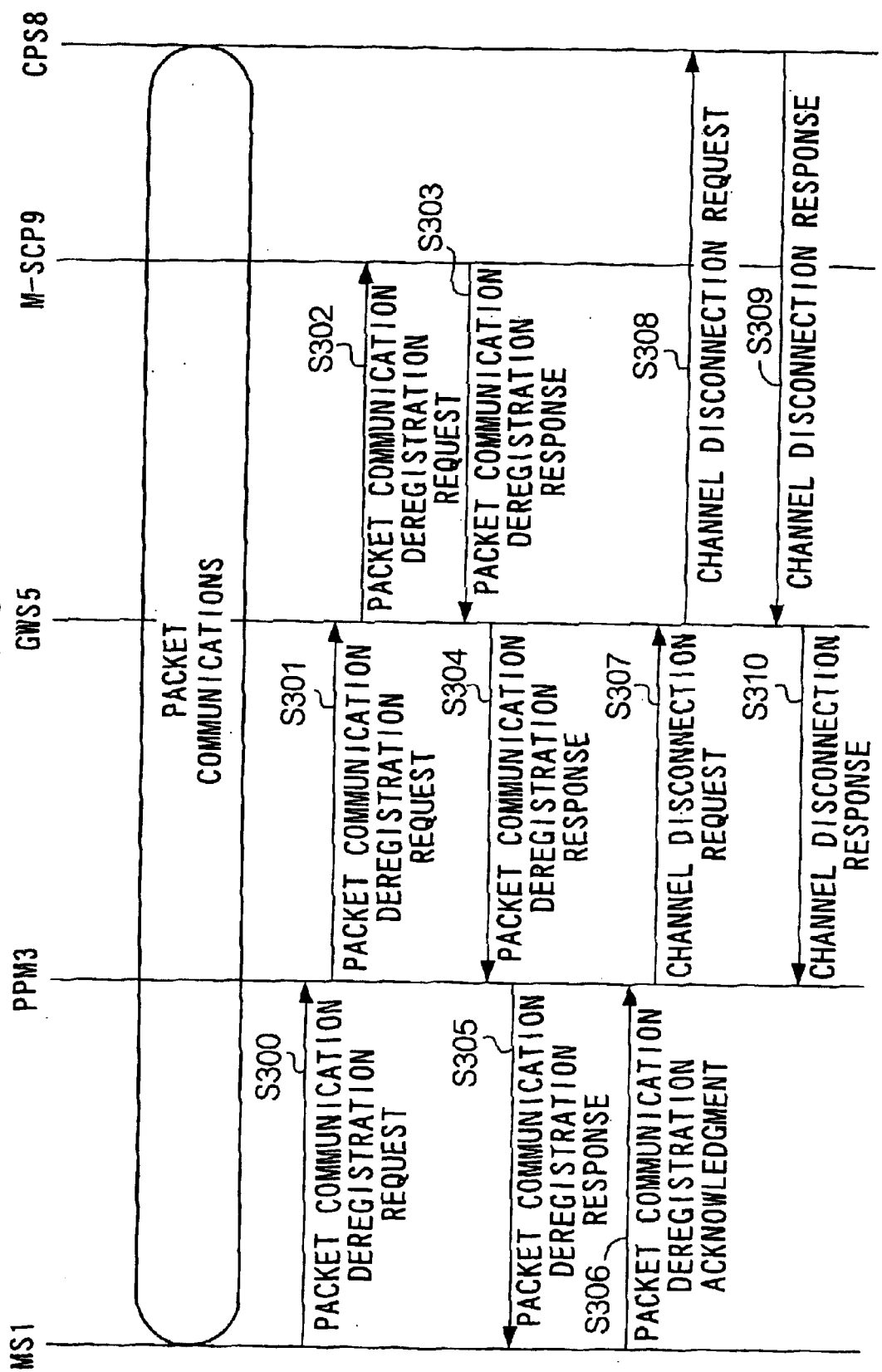
FIG. 6 is a flow diagram showing an example operating sequence after packet communications in the communication system illustrated in FIG. 1.

FIG. 6 shows an example of the operating process at the time of packet communication termination. First, a message requesting deregistration from packet communications is transmitted from the MS 1, through the PPM 3 and GWS 5 to the M-SCP 9 at S300, S301 and S302. At S303, the M-SCP 9 deregisters MS 1 from packet communications, and sends a packet communication deregistration response message. The packet communication deregistration response message is transmitted via the GWS 5 and PPM 3 to the MS 1 at S304 and S305. At S306, the MS 1 sends the PPM 3 a response message acknowledging receipt of the packet communications deregistration response message.

The PPM 3 sends the GWS 5 a message requesting disconnection of the channel at S307. At S308, the GWS 5 sends the CPS 8 the channel disconnection request message. Upon receiving the channel disconnection request message, the CPS 8 sends the GWS 5 a channel disconnection response message at S309. At S310, the GWS 5 sends the PPM 3 a channel disconnection response message, thus ending the process performed at packet communications termination.

Figure 15:
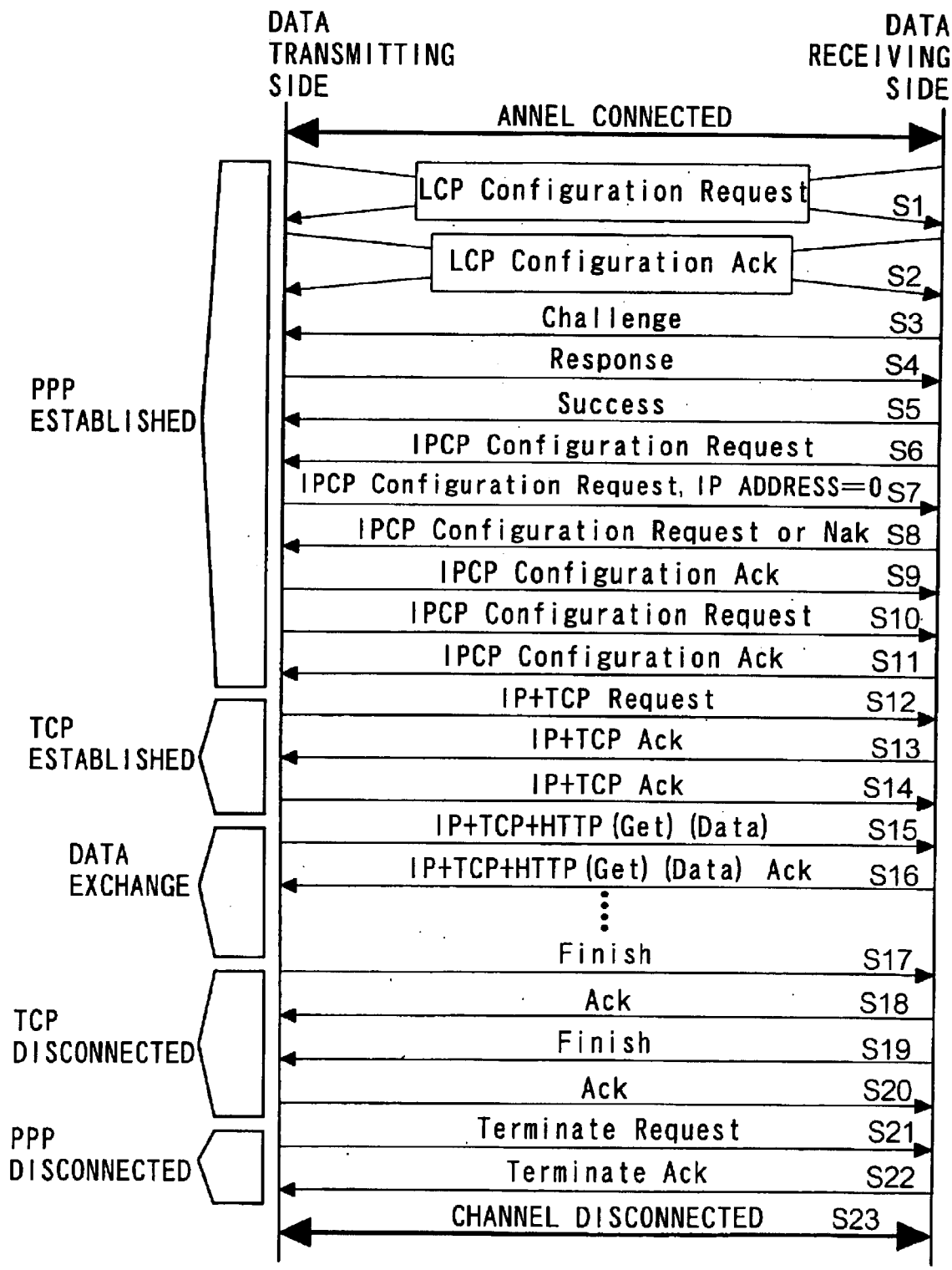
FIG. 15 is a flow diagram showing an example operating sequence for the case in which data communications are performed using TCP/IP.

3. Effects of the Embodiment (1) By comparing the conventional sequence using PPP, IP and TCP (shown in FIG. 15) with the sequence using TL between the MS 1 and GWS 5 (shown in FIG. 5), it is possible to largely reduce (to about ⅓) the number of messages (signals) exchanged between the transmitting side and the receiving side. As a result, data communications may be smoothly performed even if the hardware performance (CPU processing power, memory capacity, etc.) of the MS 1 are relatively low.

Figure 7:
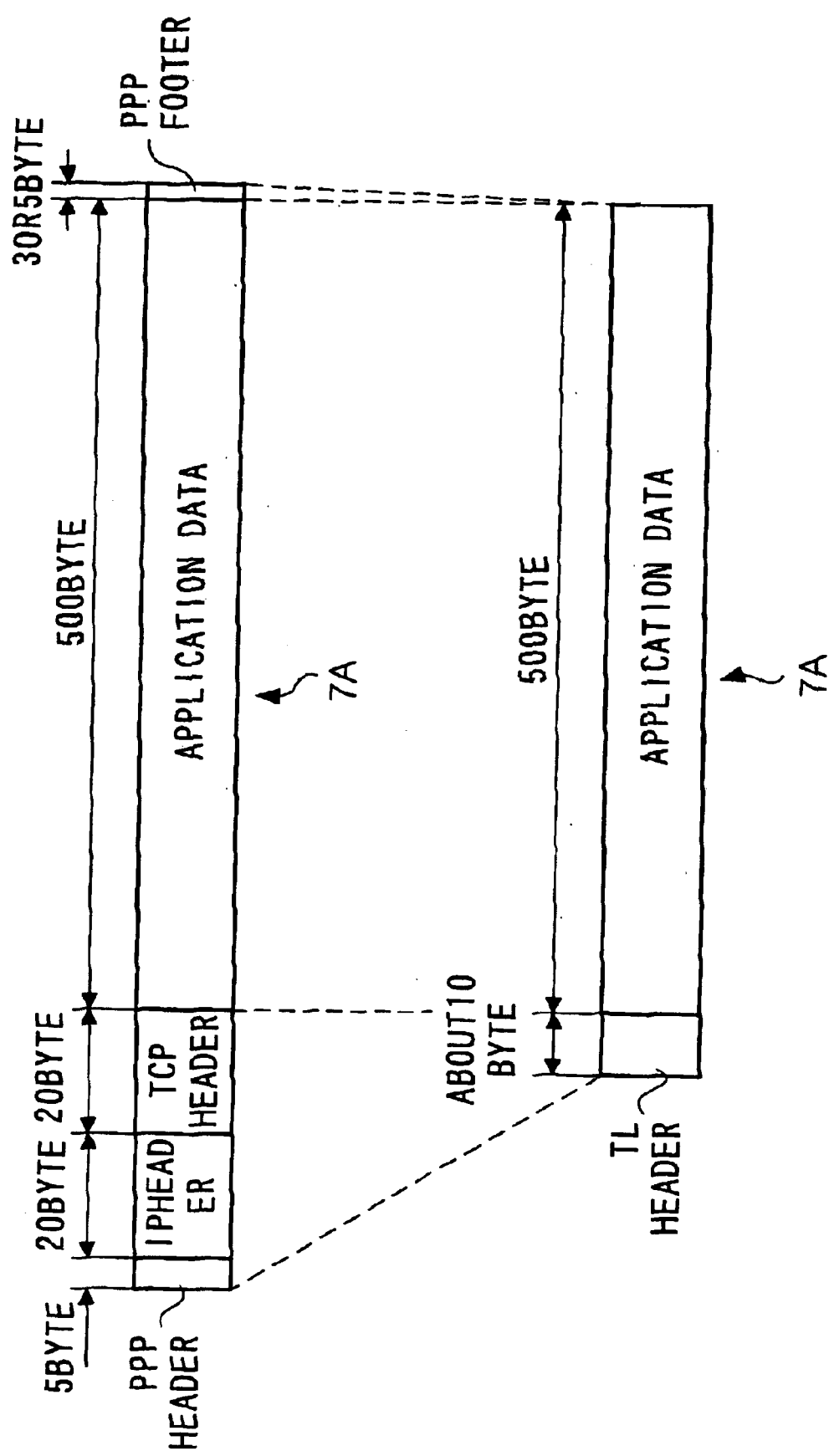
FIG. 7 is a table comparing the structure of a packet transmitted in TCP/IP communications and the structure of a packet transmitted according to a simplified protocol T6.

(2) Additionally, as shown in FIG. 7, the structure of the packet 7B transferred with the protocol TL is considerably simplified. That is, in communications by the simplified protocol TL, each packet is composed of a header of approximately 10 bytes (called the TL header) and application data (e.g. about 500 bytes, expandable to a maximum of about 1400 bytes). Consequently, the header size is largely reduced (to about ⅕) in comparison to conventional packets 7A using TCP/IP. As a result, the amount of transferred data is reduced and the communication time and bandwidth requirements are lowered.

4. Examples of Modifications

The present invention is not restricted to the above-described embodiments, and various modifications such as the examples given below are possible.

(1) Data communications downstream with respect to the network have been previously described from the viewpoint of the user of a mobile station (MS 1) receiving data distributions from a CP server (CPS 8). It is also possible to transfer data according to the previously described simplified protocol TL in data communications upstream. That is, data communications by TL are possible in cases where electronic mail is to be transmitted to a partner terminal connected to the Internet.

(2) The previously described simplified protocol (TL) is one example of a simplified protocol. Any protocol that does not have a relatively high number of messages as in conventional TCP/P, may be connected to the communication partner by a virtual circuit at the transport layer level, and allow for connection-type communications.

(3) The structure of the packets and content of the information elements described in the present embodiment are only examples. Therefore these structures and content may be of any type which allows the header size to be made smaller, and enables smooth data communications between the user terminal (MS 1) and the relay apparatus (CPS 8).

(4) The format of the data distributed from the CP server does not need to be HTML. Other formats may be employed. For example, if the distributed information is only text data, then it does not have to be a data format which uses browser-compatible tags such as HTML.

Figure 16:
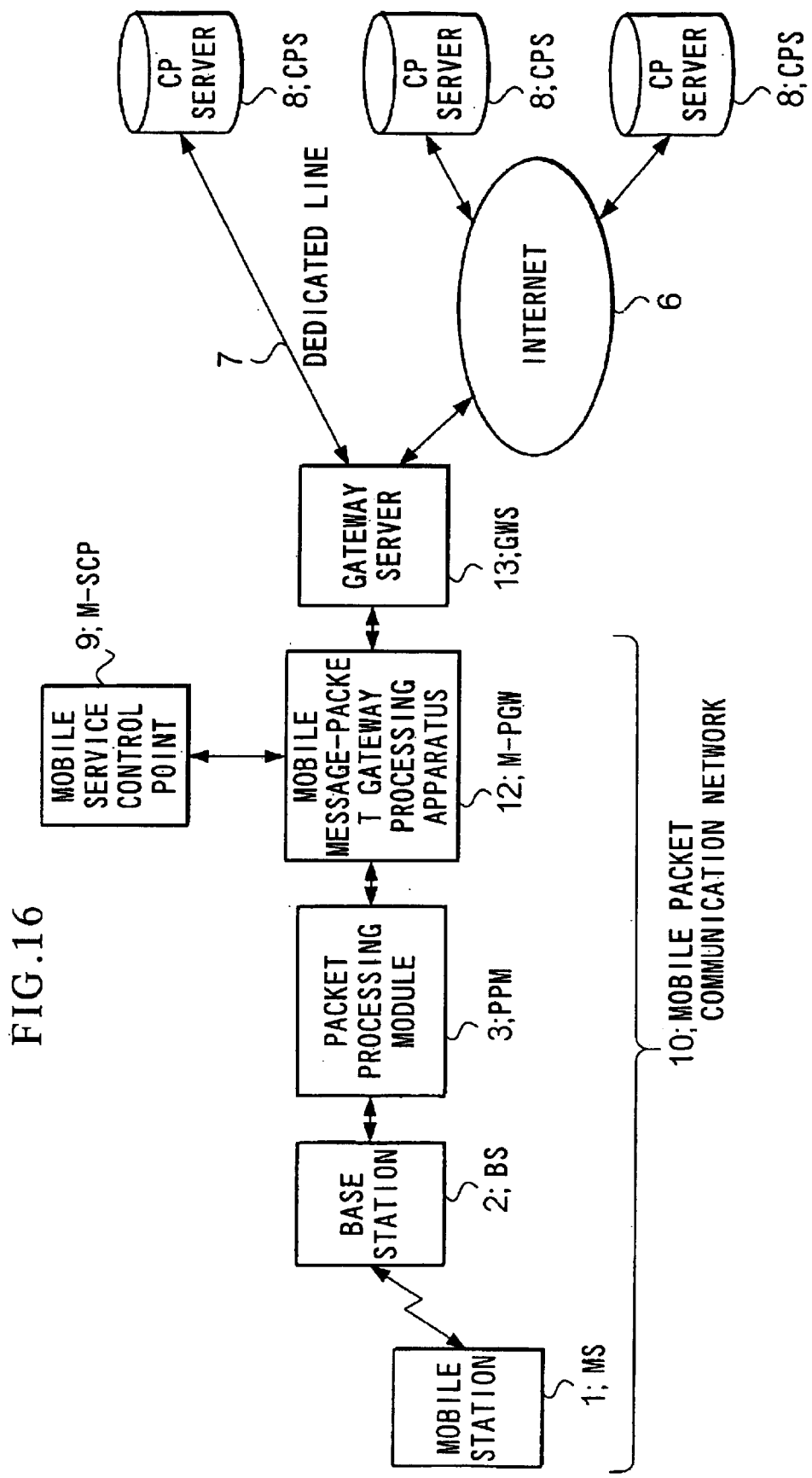
FIG. 16 is a block diagram showing the structure of another example communication system.

(5) The GWS 5 can be composed of a plurality of devices, to spread the load and traffic on the GWS 5. For example, as shown in FIG. 16, it can be separated into an M-PGW (Mobile Message-Packet Gateway Module) 11 and a GWS 13. In this example, the GWS 13 performs relay processes between the mobile packet communications network 10 and external communication paths. The M-PGW 12 performs other processes. In addition, it is possible to provide a plurality of M-PGW 11 and connect each M-PGW 11 to the GWS 13, so as to spread the load and traffic on each M-PGW.

While the present invention has been described with reference to specific exemplary embodiments, it will be evident that various modifications and changes may be made to these embodiments without departing from the broader spirit and scope of the invention as set forth in the claims. Accordingly, the specification and drawings are to be regarded in an illustrative rather than a restrictive sense.

What is claimed is:

1. A method for relaying, at a mobile packet communication network, application data between a mobile station and a content provider server, comprising the steps of:

in response to receipt of a packet communication registration request from the mobile station, identifying the mobile station based on an originator ID of the mobile station included in the packet communication registration request;

if the mobile station is successfully identified, establishing, without performing either an LCP negotiation or an IPCP negotiation, a packet communication link between the mobile station and the mobile packet communication network, which implements packet communications between the mobile station and the mobile packet communication network, wherein headers added to the application data through the packet communication link dispense with an packet protocol identifier and IP addresses of the mobile station and the content provider server;

establishing, over the packet communication link, a logical communication connections between the mobile station and the mobile communication network in response to receipt from the mobile station of a connection setup request that includes a URL of the content provider server in a data field thereof, wherein a header added to the application data through the logical communication connection comprises a logical number that identifies the logical communication connection and dispenses with port identifiers of the mobile station and the content provider server; establishing a TCP/IP connection with the content provider server;

receiving the application data from the content provider through the TCP/IP connection; and sending the received application data to the mobile station through the packet communication link and the logical communication connection.

2. A method according to claim 1, wherein the packet communication link includes at least one wireless portion therein and performs control and management of wireless communications.

3. A method according to claim 2, wherein the mobile station is a wireless mobile terminal.

4. A method according to claim 3, wherein the packet communication link performs mobility management of the mobile station.

5. A method according to claim 1, wherein the logical communication connection ensures delivery of application data between the mobile station and the content provider server.

6. A method according to claim 1, wherein the content provider server is located outside the mobile communication network.

7. A method according to claim 6, wherein the content provider server is connected to the mobile communication network over a public data communication network.

* * * * *

UNITED STATES PATENT AND TRADEMARK OFFICE
CERTIFICATE OF CORRECTION

PATENT NO. : 6,898,640 B1
APPLICATION NO. : 09/600429
DATED : May 24, 2005
INVENTOR(S) : Shigetaka Kurita et al.

It is certified that error appears in the above-identified patent and that said Letters Patent is hereby corrected as shown below:

In the Claims

Column 14, in claim 1, line 31, after "communication" delete "connections" and substitute --connection-- in its place.

Column 14, in claim 1, line 40, after "provider server;" begin a new paragraph with "establishing a TCP/IP".

Signed and Sealed this

First Day of May, 2007

JON W. DUDAS
*Director of the United States Patent and Trademark Office*